Dec. 22, 1931.  D. S. BARROWS ET AL  1,837,192
SPRING TENSIONING DEVICE
Filed March 11, 1927   2 Sheets-Sheet 1
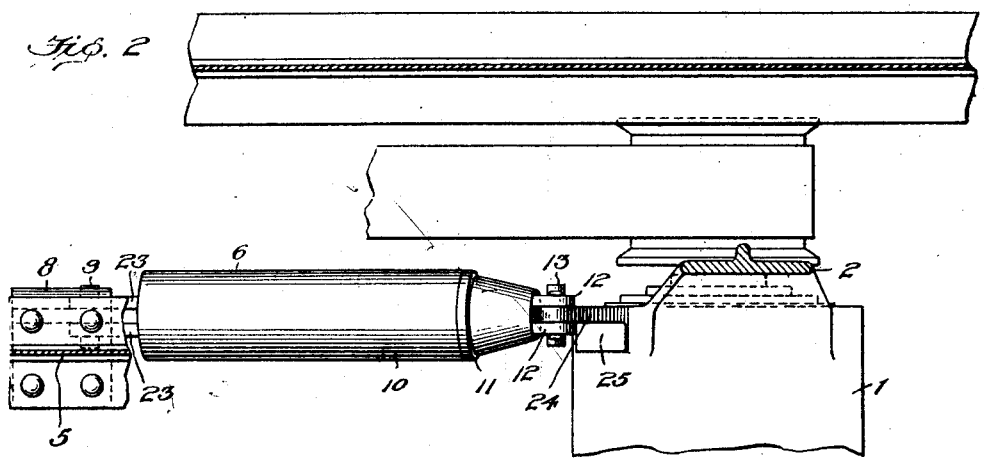
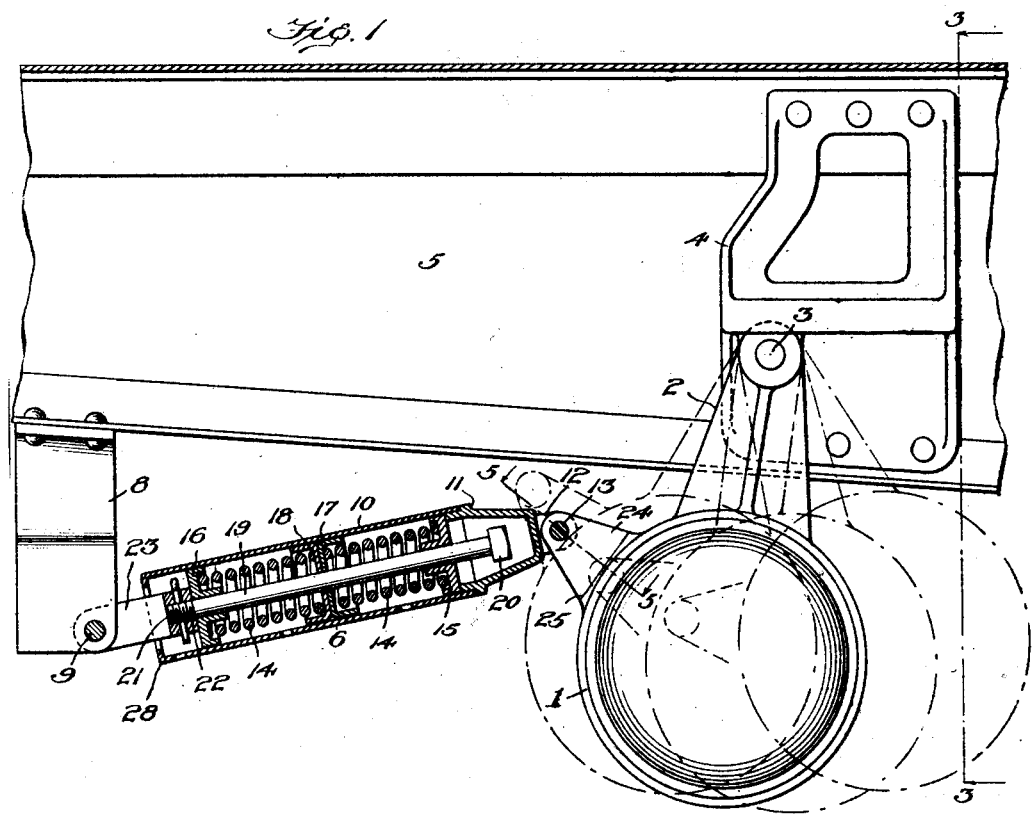

Dec. 22, 1931.  D. S. BARROWS ET AL  1,837,192
SPRING TENSIONING DEVICE
Filed March 11, 1927  2 Sheets-Sheet 2
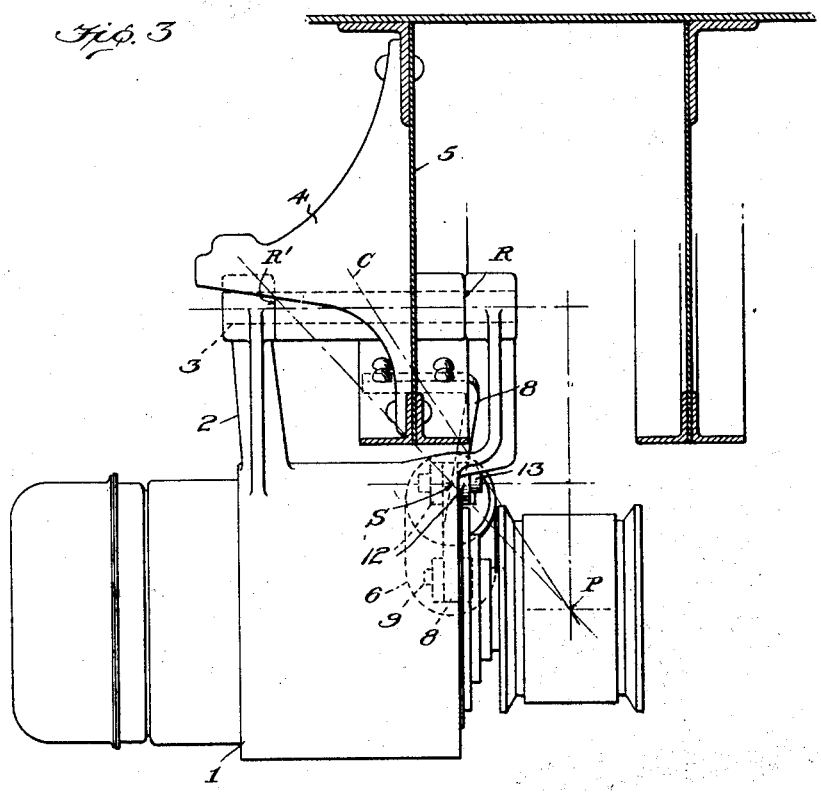
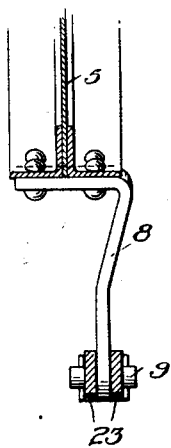
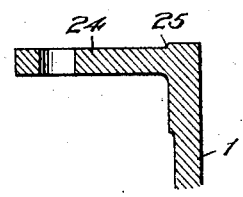
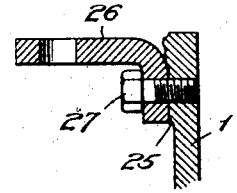

Patented Dec. 22, 1931

1,837,192

UNITED STATES PATENT OFFICE

DONALD S. BARROWS AND ELI J. BLAKE, OF ROCHESTER, NEW YORK, ASSIGNORS, BY MESNE ASSIGNMENTS, TO SIMPLEX EQUIPMENT COMPANY, INC., OF NEW YORK, N. Y., A CORPORATION OF DELAWARE

SPRING TENSIONING DEVICE

Application filed March 11, 1927. Serial No. 174,602.

Our invention relates to generator mountings and drive mechanisms in car lighting equipment and, more especially, to belt tightening devices for such generators.

An object of our invention is to provide a simple and effective device for insuring the desired tension of the belt for axle driven generators.

Another object of our invention is to provide a belt tensioning device that will reduce to the minimum strains and hence the wear on the hinge bearings of the generator.

A further object of our invention is to provide a spring tensioning unit that will be strong, rugged and economical to manufacture.

Another object is to provide a device of the above mentioned character that is well adapted to meet the varying conditions of hard, practical use. Other objects will be in part obvious or in part pointed out hereinafter.

The invention accordingly consists in the features of construction, combinations of elements, and arrangements of parts, as will be exemplified in the structure to be hereinafter described and the scope of the application of which will be indicated in the following claims.

In the accompanying drawings, in which is shown one of the various possible embodiments of our invention:

Figure 1 is a vertical longitudinal view with the spring tensioning device shown in section.

Figure 2 is a horizontal plan view in part section showing particularly the attachment of the spring tensioning device to the generator housing.

Figure 3 is a vertical transverse view showing a location of the spring tensioning device with respect to the pulley and the generator suspension bearing.

Figure 4 is a vertical transverse view showing the attachment of the spring tensioning device to the car body.

Figure 5 is a sectional view on the line 5—5 of Figure 1 showing the lug on the generator housing for attaching the spring tensioning device.

Figure 6 is a sectional view showing a method of attaching a replacement lug to the generator housing.

Referring to the drawings in greater detail, 1 is a generator pivotally suspended by the arms 2 and the hinge pin 3 from the bracket 4 suitably secured to the center sill 5. A belt tensioning device 6 may be pivotally secured to the car framing 5 by the bracket 8 and the pin 9. This device may comprise a spring housing or barrel 10 closed at one end by the cap 11 provided with lugs 12 to receive the pin 13. Within the housing, there may be assembled a plurality of springs 14 which may seat at their outer ends in the thrust collars 15 and 16 and be held in alinement at their inner ends by means of the abutting cups 17 and 18. Operatively connected to the springs by the thrust collars may be the bolt 19 having at one end a head 20 and on the other end a threaded portion 21 engaging a corresponding threaded portion 22 of the shackle 23 which may be secured to the bracket 8 by the pin 9. The cap 11 may be secured to a lug 24 which may be formed integral with the generator housing. The lug 24 may be provided with a pedestal base 25 as shown in Figures 1, 2 and 5. This pedestal is provided so that, should the bracket 24 become injured or broken it may be chipped off flush with the base of the pedestal and a replacement lug 26 be secured to the generator housing by the bolts 27 as shown in Figure 6.

In operation, the generator is normally in the position shown in the drawings so that the springs are under an initial compression and the tension on the belt is determined by two factors, namely, the weight of the generator acting through its lever arm with respect to the hinge pin 3 and the thrust of the belt tensioning device 6 acting through its lever arm with respect to the same pin. It will be noted that any further movement of the generator to the left, from the position as shown in Figure 1, will further compress the spring tensioning device but that, as the generator swings further to the left, the effective lever arm of the spring tensioning device is reduced while the effective lever arm of the weight of the generator is increased; also that any movement of the generator to the right from that shown in Figure 1 will decrease the compression of the spring tensioning device until the bolt head 20 comes in contact with the thrust collar 15 and the thrust collar 16 is in contact with the crimped shoulders 28. During this movement of the generator, however, the effective lever arm of the spring tensioning device is increased while that of the generator is decreased so that, by a proper proportioning of the related parts an approximately uniform tension or a desired variation of the tension of the belt may be obtained for any corresponding position of the generator throughout the operating range of the spring tensioning device.

It will also be noted that after the bolt head 20 comes in contact with the thrust collar 15, any further movement to the right will be opposed by the compression of the spring tensioning device under the action of the bolt head 20 against the thrust collar 15 so that, should a belt break as not infrequently happens, the spring tensioning device of my invention will act promptly to oppose any violent swinging of the generator which might cause damage to the equipment and quickly bring the generator to rest in a position corresponding to the neutral position of the spring tensioning device.

There is a tendency in long springs confined in a barrel under compression to buckle and wear against the side of the barrel. In our invention, this may be prevented by employing a plurality of springs 14 seated in the cups 17 and 18 which are adapted to slide freely within the barrel and maintain the springs in alinement.

It will thus be seen that there has been provided in this invention an apparatus in which the several objects hereinabove set forth, together with many thoroughly practical advantages, are successfully achieved and that the apparatus is well adapted to meet the varying conditions of hard, practical use.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

Having now described our invention, we claim:

1. A belt tensioning device for car lighting generators including a housing, a plurality of springs confined therein, means operatively connecting said springs whereby longitudinal motion in either direction will be opposed by said spring, and means adjacent ends of said springs to maintain alinement of the springs.

2. In car lighting equipment, the combination of a generator mounted beneath the car to move toward and away from an axle of the car, and a belt for driving said generator from said car axle, of a belt tensioning device comprising a housing, spring means mounted therein, means connecting said spring with said generator adapted upon movement of said generator in either direction to cause stressing of said spring means, and means intermediate of the ends of said spring means and slidable relative to said housing for preserving alinement of said spring.

3. In car lighting equipment, the combination of a generator mounted beneath the car to move toward and away from an axle of the car, and a belt for driving said generator from said car axle, of a belt tensioning device including a housing, a plurality of springs within said housing and arranged in end to end relation, and means slidably mounted within said housing and having adjacent ends of said springs engaged and guided thereby.

4. In car lighting equipment, the combination, of a generator mounted beneath the car to move toward and away from an axle of the car, and a belt for driving said generator from said car axle, of a belt tensioning device including a housing, a plurality of springs within said housing and arranged in end to end relation, a pair of thrust collars in said housing, one at each end of said springs, and means slidably mounted in said housing and having adjacent ends of said springs engaged and guided thereby.

In testimony whereof we affix our signatures.

DONALD S. BARROWS.
ELI J. BLAKE.